US010587850B2

United States Patent
Ishida et al.

(10) Patent No.: US 10,587,850 B2
(45) Date of Patent: Mar. 10, 2020

(54) PROJECTOR AND METHOD FOR CONTROLLING LIGHT SOURCE FOR PROJECTOR

(71) Applicant: NEC Display Solutions, Ltd., Tokyo (JP)

(72) Inventors: Kenji Ishida, Tokyo (JP); Tohru Kataoka, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/466,593

(22) PCT Filed: Dec. 14, 2016

(86) PCT No.: PCT/JP2016/087270
§ 371 (c)(1),
(2) Date: Jun. 4, 2019

(87) PCT Pub. No.: WO2018/109875
PCT Pub. Date: Jun. 21, 2018

(65) Prior Publication Data
US 2019/0320151 A1 Oct. 17, 2019

(51) Int. Cl.
*H04N 9/31* (2006.01)
*H04N 5/57* (2006.01)
*H04N 7/01* (2006.01)

(52) U.S. Cl.
CPC .......... *H04N 9/3179* (2013.01); *H04N 5/57* (2013.01); *H04N 7/0117* (2013.01); *H04N 9/3155* (2013.01)

(58) Field of Classification Search
CPC ............ G09G 2340/0407; H04N 9/3155
See application file for complete search history.

(56) References Cited

U.S. PATENT DOCUMENTS

| 6,084,692 A * | 7/2000 | Ohtani | H04N 1/00795 358/505 |
| 2003/0169247 A1* | 9/2003 | Kawabe | G09G 3/342 345/204 |
| 2013/0050291 A1* | 2/2013 | Nobori | H04N 9/3155 345/690 |

FOREIGN PATENT DOCUMENTS

| JP | 2002-084440 A | 3/2002 |
| JP | 2003-036063 A | 2/2003 |

(Continued)

OTHER PUBLICATIONS

International Search Report (ISR) (PCT Form PCT/ISA/210), in PCT/JP2016/087270, dated Mar. 21, 2017.

*Primary Examiner* — Paulos M Natnael
(74) *Attorney, Agent, or Firm* — McGinn IP Law Group, PLLC

(57) ABSTRACT

A projector includes: an image input unit that, upon the input of a first image signal synchronized with a vertical synchronizing signal, sends image input information; a resolution conversion output unit that converts the first image signal to a second image signal that indicates an image with a prescribed resolution and supplies the result as output; a light source unit that is provided with a light source and an image-forming element that uses illumination light from the light source to generate image light; a light source control unit that uses the image input information to control the light quantity of the light source; and an image-forming element drive unit that drives the image-forming element on the basis of the second image signal. The image input unit sends image input information synchronized with a second vertical synchronizing signal that follows the first vertical synchronizing signal.

6 Claims, 9 Drawing Sheets

(56) References Cited

FOREIGN PATENT DOCUMENTS

| | | | |
|---|---|---|---|
| JP | 2004-325629 | A | 11/2004 |
| JP | 2008-145916 | A | 6/2008 |
| JP | 2008-216560 | A | 9/2008 |
| JP | 2009-089086 | A | 4/2009 |
| JP | 2012-095945 | A | 5/2012 |
| WO | WO 2016/002075 | A1 | 1/2016 |

* cited by examiner

PROJECTOR AND METHOD FOR CONTROLLING LIGHT SOURCE FOR PROJECTOR

TECHNICAL FIELD

The present invention relates to a projector and a method for controlling the light source of a projector.

BACKGROUND ART

FIG. 1 is a block diagram showing the configuration of a projector in which brightness is adjusted according to the average luminance level and the state of the luminance distribution of an image signal that is received as input such as is disclosed in Patent Document 1 (WO2012/095945A1).

Upon the reception of an image signal that indicates an image, projector 1 shown in FIG. 1 projects the image that is indicated by the image signal upon a projection surface such as a screen. Projector 1 includes: image input unit 10, resolution conversion unit 20, video output unit 30, light source control unit 40, light source unit 50, LCD (Liquid Crystal Display) drive unit 60, projection lens 70, and CPU (Central Processing Unit) 80.

Image input unit 10, resolution conversion unit 20, video output unit 30, light source control unit 40, light source unit 50, LCD drive unit 60, and CPU 80 are connected by way of a serial or parallel system bus 90.

Image input unit 10 is provided with a signal-determining unit 101, and resolution conversion unit 20 is provided with frame memory 201. Video output unit 30 is provided with image signal detection unit 301, image quality improvement circuit 302, γ correction unit 303, entire conversion unit 304, and light source control unit 40 is provided with SUB CPU 401.

Image input unit 10 receives various image signals that are applied as input to projector 1, for example, a digital image signal such as an HDMI (High-Definition Multimedia Interface) (registered trademark) signal, a DisplayPort signal, and a DVI (Digital Visual Interface) signal or an analog image signal such as a D-SUB signal or a video signal such as a composite video signal and an S video signal.

Image input unit 10 converts theses video signals to a parallel image signal (an RGB signal or a color-difference YCbCr signal) having 8-bit or 10-bit gradation and transmits the result to resolution conversion unit 20. The decoding of a clock signal and horizontal synchronizing signal, vertical synchronizing signal, and parallel image signal data enable signal that are synchronized with the parallel image signal data is carried out in image input unit 10. Signals are converted to a parallel image signal using dedicated LSI (Large-Scale Integration) (not shown in the figures) that is provided in the image input unit, for example, a D-SUB signal being converted to a parallel image signal using an image-dedicated AD converter, a Video signal being converted to a parallel image signal using a Video decoder, and HDMI input being converted to a parallel image signal using an HDMI receiver.

Signal-determining unit 101 that is provided in image input unit 10 has a circuit for acquiring input resolution information of an image signal that is received as input in projector 1. The circuit that is provided in signal-determining unit 101 is made up from a counter circuit of multiple bits and acquires, from the parallel image signal data that have been converted by, for example, the above-described image dedicated AD converter or HDMI receiver, horizontal synchronizing signal, vertical synchronizing signal, and parallel image signal data enable signal, input resolution information that includes at least the following content:

The frequency of a horizontal/vertical synchronizing signal

Vertical synchronizing signal: the number of horizontal synchronizing signals in one cycle Horizontal synchronizing signal: the number of data signals in one cycle Horizontal/vertical data valid interval Clock frequency Resolution conversion unit 20 carries out the conversion of image signals in accordance with the output resolution. The image signals that are transmitted from image input unit 10 are of various resolutions, and in addition, the output resolution of projector 1 is of uniform fixed resolutions such as WUXGA, WXGA, and XGA, and as a result, the process of converting the resolution of an image signal in accordance with the output resolution is carried out in resolution conversion unit 20. A reducing process is performed when the resolution of the image signal that is received is greater than the resolution of the image signal that is to be supplied as output, and an enlarging process is carried out when the resolution of the image signal that is received is smaller than the resolution of the image signal that is to be supplied as output.

Frame memory 201 that is provided in resolution conversion unit 20 is used for holding several frames of the parallel image signal data from image input unit 10 for carrying out the enlarging/reducing process by resolution conversion unit 20. For example, when the frequency of the vertical synchronizing signal that is indicated in the input resolution information is 30 Hz and an image signal for which the frequency of the vertical synchronizing signal is 60 Hz is to be supplied as output, parallel image signal data for at least a one-frame portion must be held. A large-scale memory is necessary to hold this parallel image signal data. Frame memory 201 is also referred to as a "frame buffer."

Video output unit 30 has the object of performing adjustment of the white balance and color tone of parallel image signal data that are synchronized with the horizontal synchronizing signal and vertical synchronizing signal of the output resolution that were converted in resolution conversion unit 20 and converts and supplies an image signal by means of image signal detection unit 301, image quality improvement circuit 302, γ correction unit 303, and entire conversion unit 304. The operation of each unit is as described hereinbelow.

Image signal detection unit 301 detects image input information such as the average luminance level or luminance distribution for each frame for image signal data from resolution conversion unit 20.

Image quality improvement circuit 302 uses contour correction technology that uses an optical illusion of human vision known as the Craik-O'Brien Effect to improve contrast.

γ Correction unit 303 is a block that subjects the image signal from resolution conversion unit 20 to brightness adjustment for each single color and typically performs processing according to the following formula.

$$\text{output}=255 \times (\text{input} \div 255)^{(1/\gamma)}$$

Entire conversion unit 304 performs conversion of the overall color tone of projector 1 and typically performs processing according to the following formula.

$$\begin{pmatrix} R_{o1(x,y)} \\ G_{o1(x,y)} \\ B_{o1(x,y)} \end{pmatrix} =$$

[Numerical Expression 1]

$$\begin{pmatrix} C_{11} & C_{21} & C_{31} \\ C_{12} & C_{22} & C_{32} \\ C_{13} & C_{23} & C_{33} \end{pmatrix} \begin{pmatrix} R_{i1(x,y)} \\ G_{i1(x,y)} \\ B_{i1(x,y)} \end{pmatrix} + \begin{pmatrix} B_r \\ B_g \\ B_b \end{pmatrix}$$

Here, $R_{i1(x, y)}$, $G_{i1(x, y)}$, and $B_{i1(x, y)}$ are the input signals of the image that is to be converted, $C_{11}$-$C_{33}$ are matrix coefficients, $B_r$, $B_g$, and $B_b$ are offset coefficients, and $R_{o1(x, y)}$, $G_{o1(x, y)}$, and $B_{o1(x, y)}$ are the output signals of the image that has been converted.

Light source control unit 40 controls the light quantity of projected image light that is supplied by light source unit 50. This light quantity control will be described in the explanation of light source unit 50.

FIG. 2 shows the configuration of light source unit 50.

Light source unit 50 includes: iris 503; rod integrator 504; lamp 510; dichroic mirrors 522 and 523; mirrors 524, 531, and 532; LCDs 541-543; and cross-dichroic prism 550.

The light quantity of white light that is emitted by lamp 510 is controlled by iris 503. Iris 503 is provided with an opening that can be opened and closed, and the control of the opened/closed state of the opening is performed by the above-described light source control unit 40. White light, for which the light quantity is controlled by iris 503, is first made uniform by rod integrator 504 and then irradiated into dichroic mirror 522. Dichroic mirror 522 reflects the light of blue wavelength (B light) and allows the passage of light of wavelengths other than blue, and the reflected B light is turned back by mirror 531 to illuminate LCD 541.

The light that passes through dichroic mirror 522 is irradiated into dichroic mirror 523. Dichroic mirror 523 reflects light of green wavelength (G light) and allows the passage of light of wavelengths other than green, and the reflected G light illuminates LCD 542.

Light from which both B light was extracted by reflection by dichroic mirror 522 and G light was extracted by reflection by dichroic mirror 523 and that has passed through dichroic mirror 523 becomes chiefly light of the red wavelength (R light). R light that has passed through dichroic mirror 523 is turned back by mirrors 524 and 532 to illuminate LCD 543.

LCDs 541-543 that serve as image-forming elements form images of B light, G light, and R light, respectively, and form image light of B light, G light, and R light by being illuminated by light of each color. The image light of each of these colors is combined by cross-dichroic prism 550 and projected by projection lens 70.

LCD drive unit 60 drives each of LCDs 541-543 in light source unit 50 in accordance with an image signal from video output unit 30 and causes the generation of image light.

Projection lens 70 projects the image light that was generated in light source unit 50 upon a projection surface.

CPU 80 carries out the coefficient settings required for conversion for performing resolution conversion (such as enlarging/reducing processing and frequency conversion processing) that is carried out in resolution conversion unit 20 on the basis of input resolution information that was acquired in signal-determining unit 101. In addition, CPU 80 periodically acquires image input information (average luminance level and luminance distribution) that is detected by image signal detection unit 301 by way of system bus 90 and transmits to light source control unit 40 control data for performing iris opening/closing control of iris control unit 503 in light source unit 50.

SUB CPU 401 that is provided in light source control unit 40 receives control data that are transmitted from CPU 80 by way of system bus 90 and generates a control signal for carrying out the iris opening/closing control of iris control unit 503 in light source unit 50.

RELATED ART DOCUMENTS

Patent Documents

Patent Document 1: WO2012/095945A1

SUMMARY

Problem to be Solved by the Invention

In image signal detection unit 301 shown in FIG. 1, image input information is detected that includes, for example, the average luminance level and luminance distribution (histogram data) for an image signal that is received in video output unit 30.

FIG. 3 is a figure showing the timings of reception of a vertical synchronizing signal of the image signal that is applied as input to image input unit 10, an image signal that is applied as input to image input unit 10, an image signal that is applied as input to video output unit 30, image input information that is detected in image signal detection unit 301, and image input information in CPU 80, and the timing of transmission by CPU 80 of control data to light source control unit 40.

FIG. 4 shows the luminance distribution (histogram data) of an image signal having 8-bit gradation, and the luminance distribution shows the distribution of the number of pixels of each luminance level in one screen of an image realized by an image signal as shown in the figure.

As shown in FIG. 3, the image input information can first be acquired by scanning the image signal input of a one-screen portion, whereby a shift of one vertical image valid interval portion necessarily occurs.

In addition, in the circuit shown in FIG. 1, CPU 80 acquires image input information from image signal detection unit 301 by way of system bus 90 and performs the process of transmitting control data to light source control unit 40 without synchronizing with the image signal input, and a delay of one frame portion or more therefore occurs including the time lag from the acquisition of the image input information to the completion of updating the control data to light source control unit 40.

As described above, when a divergence of a one-frame portion or more occurs by asynchrony in the control of the projection screen of the actual image signal and the control of the light source when, for example, a large change occurs in the luminance distribution of the image signal input (a change of scene), the problem arises that optimum light source control over the image signal that indicates the image that is to be projected cannot be achieved for an instant (only one frame of at least 1/60 second but no greater than 2/60 second).

In order to solve the above-described problem by the configuration shown in FIG. 1, a configuration can be considered in which a frame buffer is newly mounted in video output unit 30 to adjust the control of the light source and the delay of the image signal input, but such a configuration necessitates mounting a large-scale memory in video output unit 30.

The present invention realizes optimum light source control over an image signal that indicates an image that is to be projected for just one frame without the use of a large-scale memory.

Means for Solving the Problem

The projector of an exemplary aspect of the present invention includes:

an image input unit that receives as input a first image signal that is synchronized with a vertical synchronizing signal;

a resolution conversion output unit that converts the first image signal to a second image signal that indicates an image of a predetermined resolution and supplies the result;

a light source unit that is provided with a light source and an image-forming element that uses the illumination light from the light source to generate image light;

a light source control unit that controls the light quantity of the light source; and an image-forming element drive unit that drives the image-forming element on the basis of the second image signal, wherein:

the image input unit calculates the ratio of the resolution of the image indicated by the first image signal and the resolution of the image indicated by the second image signal, the average luminance level of the first image signal, first histogram data that is the luminance distribution of the first image signal, and second histogram data obtained by multiplying the ratio by the first histogram data;

the image input unit sends to the light source control unit image input information that contains the average luminance level and the second histogram data;

the light source control unit uses the image input information to control the light source;

the image input unit transmits to the light source control unit the image input information for the first image signal that is synchronized with the first vertical synchronizing signal in synchronization with a second vertical synchronizing signal that follows the first vertical synchronizing signal; and the resolution conversion output unit carries out conversion such that the second image signal is supplied between the second vertical synchronizing signal and a third vertical synchronizing signal that follows the second vertical synchronizing signal.

The method for controlling a light source of a projector of an exemplary aspect of the present invention is a light source control method carried out in a projector that includes:

an image input unit that receives as input a first image signal that is synchronized with a vertical synchronizing signal;

a resolution conversion output unit that converts the first image signal to a second image signal that indicates an image of a predetermined resolution and supplies the result as output;

a light source unit that is provided with a light source and an image-forming element that uses illumination light from the light source to generate image light;

a light source control unit that controls the light quantity of the light source; and an image-forming element drive unit that drives the image-forming element on the basis of the second image signal, the light source control method having steps of:

calculating, by the image input unit, the ratio of the resolution of the image indicated by the first image signal and the resolution of the image indicated by the second image signal, the average luminance level of the first image signal, first histogram data that are the luminance distribution of the first image signal and second histogram data that are obtained by multiplying the ratio by the first histogram data;

sending, by the image input unit, to the light source control unit image input information that contains the average luminance level and the second histogram data;

using, by the light source control unit, the image input information to control the light source;

sending, by the image input unit, to the light source control unit the image input information for the first image signal that is synchronized with the first vertical synchronizing signal in synchronization with a second vertical synchronizing signal that follows the first vertical synchronizing signal; and carrying out, by the resolution conversion output unit, conversion such that the second image signal is supplied between the second vertical synchronizing signal and a third vertical synchronizing signal that follows the second vertical synchronizing signal.

Effect of the Invention

In the present invention that is provided with the above-described configuration, optimum light source control is realized over an image signal that indicates an image that is to be projected for just one frame without the use of large-scale memory.

EXEMPLARY EMBODIMENT

Figure 5:
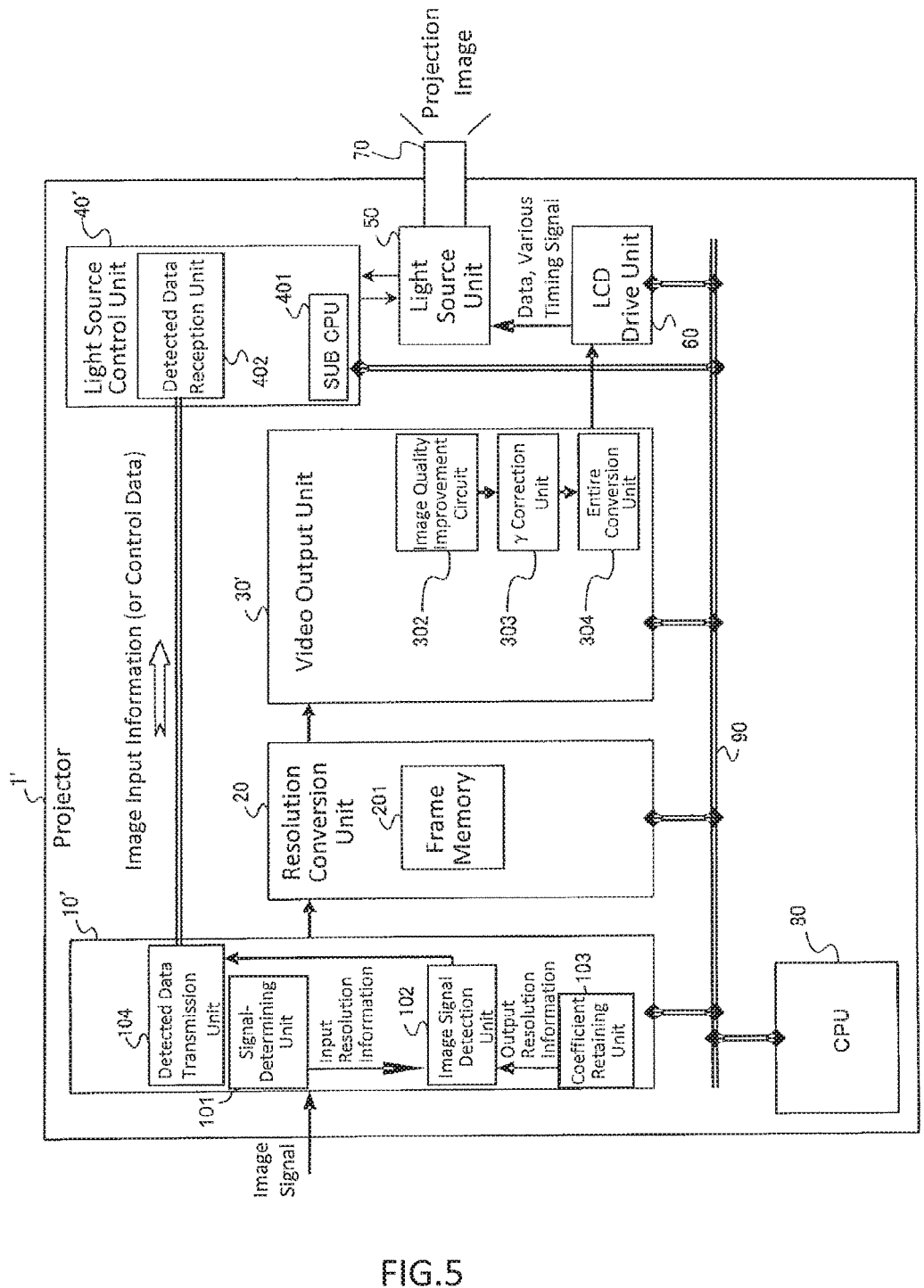
FIG. 5 is a block diagram showing the configuration of an exemplary embodiment of a projector according to the present invention.

FIG. 5 is a block diagram showing the configuration of an exemplary embodiment of the projector according to the present invention. Projector 1' shown in FIG. 5 is provided with a configuration similar to that of projector 1 shown in FIG. 1, and similar constituent elements are given the same reference numbers as were used in FIG. 1.

In projector 1' of the present exemplary embodiment, image signal detection unit 102 is provided in image input unit 10' to which an image signal is applied as input from the outside.

In this way, image input information can be acquired from the image signal before the image signal is supplied to resolution conversion unit 20.

Video output unit 30' has circuits having the object of adjusting white balance and color tone. The processing that uses frame memory 201 in resolution conversion unit 20, the processing that is carried out in image quality improvement unit 302, γ correction unit 303, and entire conversion unit 304 in video output unit 30', the configuration and operation of light source unit 50, and the operation of LCD drive unit 60 are all similar to projector 1 shown in FIG. 1.

In addition to the above-described image signal detection unit 102, coefficient retaining unit 103 and detected data transmission unit 104 are provided in image input unit 10' of projector 1' of the present exemplary embodiment, and detected data reception unit 402 is provided in light source control unit 40'.

Coefficient retaining unit 103 sets and holds the value of the output resolution that is the resolution of the image signal that is to be supplied by video output unit 30' to LCD drive unit 60.

In image signal detection unit 102 that is mounted in image input unit 10': an image signal and input resolution information that is the resolution of the image signal that is applied as input to image input unit 10' from signal-determining unit 101 and the output resolution information that is held by coefficient retaining unit 103 are received; the ratio is calculated between the input resolution of the image signal that is received and the output resolution of the image signal that is to be supplied as output; the number of pixels is counted for each gradation of the luminance distribution (first histogram data) of the image signal that is received as input in image signal detection unit 102; and the count value and the above-described ratio are multiplied together to calculate the luminance distribution (second histogram data) that accords with the output resolution of the image signal that is to be supplied.

The luminance distribution (second histogram data) that was calculated in image input unit 102 is sent as the image input information to detected data reception unit 402 by way of detected data transmission unit 104.

Figure 8:
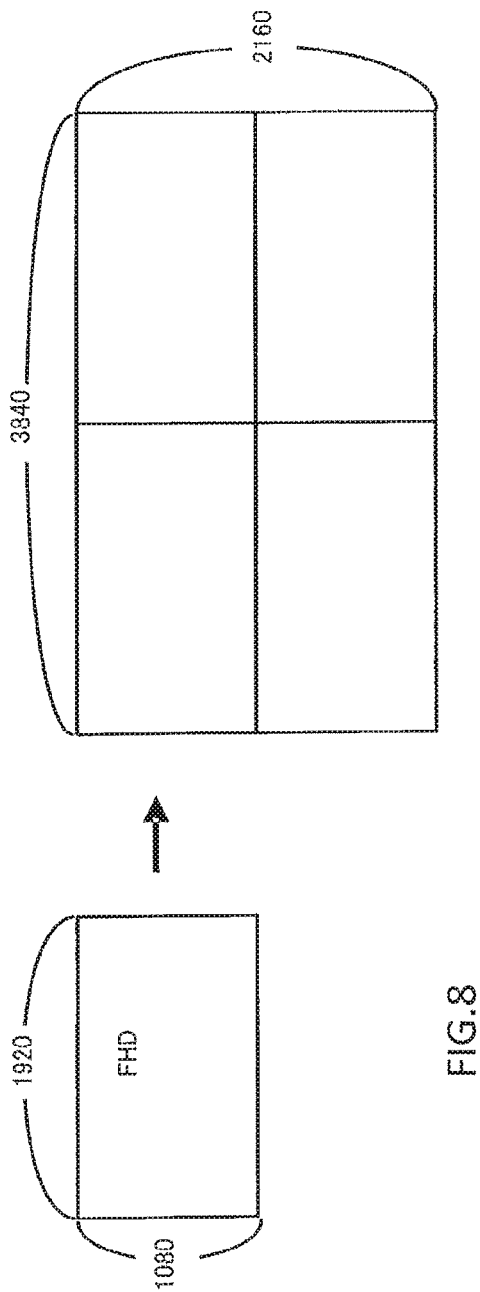
FIG. 8 shows an image realized by an image signal that is applied as input to an exemplary embodiment of the present invention and an image realized by an image signal that has been converted and supplied.
Figure 9:
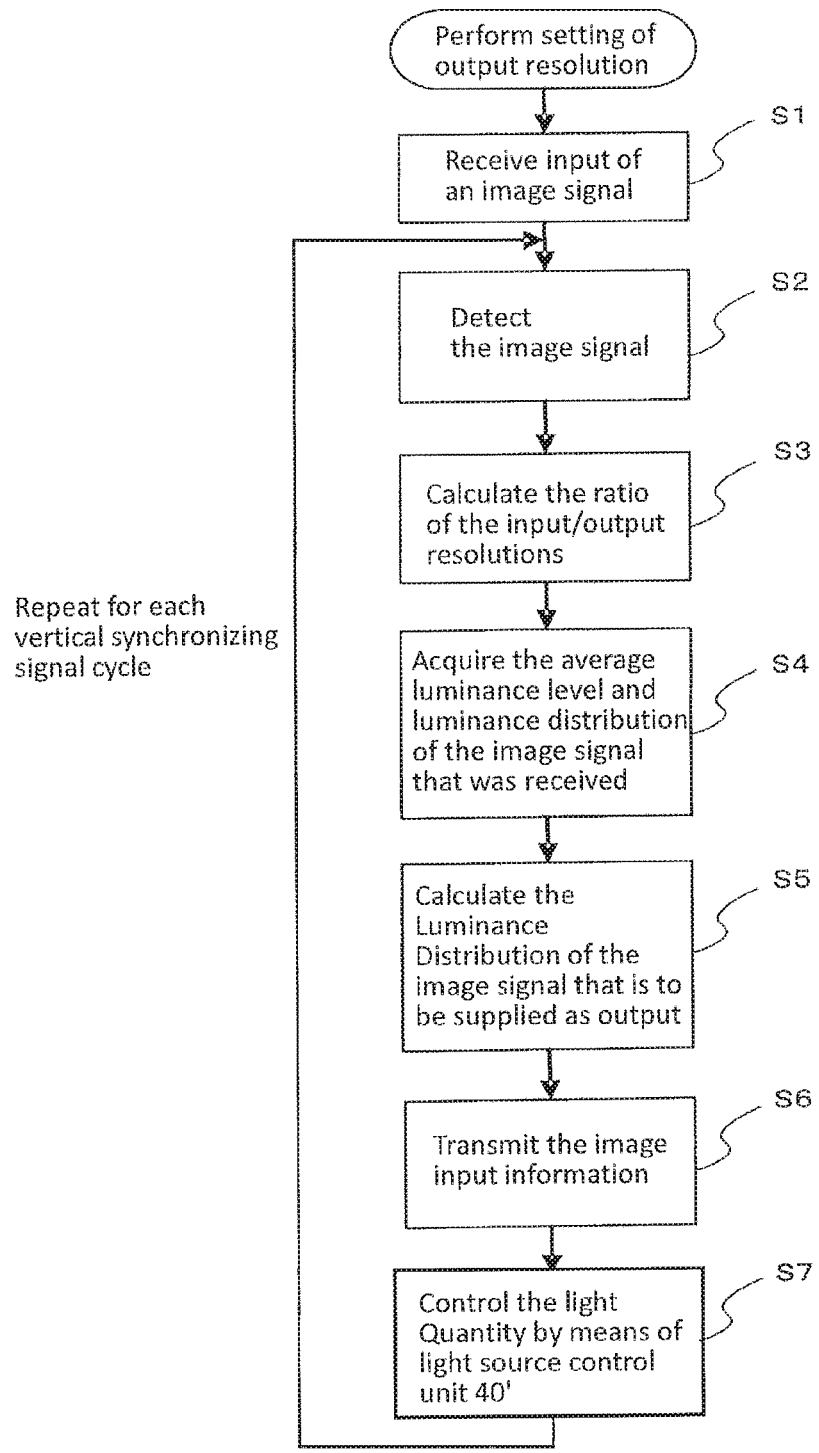
FIG. 9 is a flow chart showing the operation of an exemplary embodiment of the present invention.

FIG. 9 is a flow chart showing the operation of the present exemplary embodiment. In the following explanation, the image signal that is received in image input unit 10' is a signal that indicates an FHD (1920×1080) image, and the image signal that is supplied by video output unit 30' is a signal that indicates an UHD (3840×2160) image as shown in FIG. 8, and as a result, each process carried out in projector 1' when the luminance gradation is an 8-bit total black display (luminance level 0; colorless) is described with reference to FIG. 9. At this time, a signal line other than system bus 90 is used.

Coefficient retaining unit 103 sets the resolution of the image signal that is to be supplied by video output unit 30' and both holds and supplies this resolution to image signal detection unit 102. In the case of the present exemplary embodiment (FHD input-UHD output), $HRES_0=3840$ and $VRES_0=2160$ are held and supplied to image signal detection unit 102.

When an image signal is applied as input to image input unit 10' (Step S1), signal-determining unit 101 detects, for example, the horizontal/vertical resolution information and frequency of the horizontal/vertical synchronizing signals of the received image signal and both holds the horizontal/vertical resolution information that was detected and supplies this horizontal/vertical resolution information to image signal detection unit 102 (Step S2). In the case of the present exemplary embodiment (FHD input-UHD output), signal-determining unit 101 holds horizontal input resolution=1920 and vertical input resolution=1080 and supplies these resolutions to image signal detection unit 102.

Image signal detection unit 102 that has received the resolution of the image signal that is supplied by video output unit 30' from coefficient retaining unit 103 and the resolution of the image signal that is applied as input to image input unit 10' from signal-determining unit 101 calculates the ratio of these resolutions (Step S3). Here, image signal detection unit 102 calculates the ratio from the output resolution settings [$HRES_0$ and $VRES_0$] that are held in coefficient retaining unit 103 and the horizontal/vertical resolution information that was detected and held in signal-determining unit 101 by multiplying horizontal output resolution $HRES_0$÷horizontal input resolution by vertical output resolution $VRES_0$÷vertical input resolution.

When the ratio is set as 18 bits, this being the total of 3 integer bits+15 decimal point bits:

Horizontal output resolution: 3840d (decimal notation): 111100000000b (binary notation): F00h (hexadecimal notation)

Horizontal input resolution: 1920d: 011110000000b: 780h

Vertical output resolution: 2160d: 100001110000b: 870h

Vertical input resolution: 1080d: 010000111000b: 438h and for the three integer bits of the ratio, a value of 100b and a multiple of 4 are calculated.

Image signal detection unit 102 next detects and acquires the average luminance level/luminance distribution (first histogram data) of the image signal that is applied as input to image input unit 10' (Step S4).

In the case of the present exemplary embodiment (total black display of FHD input-UHD output), the acquisition of the average luminance level and luminance distribution (first histogram data) that is carried out in Step S4 results in an average luminance level of 0 (zero), a number of pixels of luminance gradation level 0 of 1920×1080=2073600, and a number of pixels from luminance gradation level 1 to 255 of 0 (zero).

Image signal detection unit 102, next calculates by approximation the luminance distribution (second histogram data) of the image signal that is to be supplied as output by multiplying the ratio that was calculated in Step S3 by the luminance distribution (first histogram data) of the input image signal that was detected and acquired in Step S4 (Step S5).

In the case of the present exemplary embodiment (total black display of FHD input-UHD output), the calculation that was performed in Step S5 for the luminance distribution (second histogram data) of the image signal that is to be supplied yields the number of pixels of gradation level 0 as 2073600×4=8294400 (equivalent to the calculation value 3840×2160) and a number of pixels of gradation levels 1 to 255 of 0×4=0 (zero).

Figure 7:
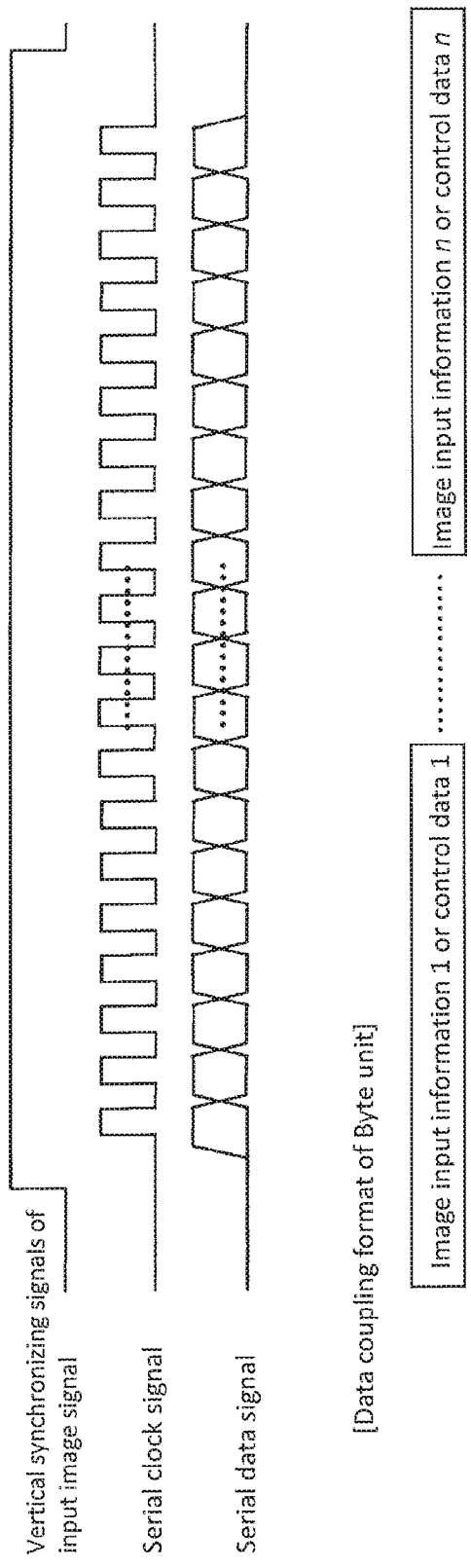
FIG. 7 shows image input information in an exemplary embodiment of the present invention.

Image signal detection unit 102 next, at the timing of the vertical synchronizing signal of the image signal that was received, converts the image input information that contains the average luminance level that was detected in Step S4 and the luminance distribution (second histogram data) that was calculated in Step S5 to serial data, as shown in FIG. 7, and sends the serial data to detected data transmission unit 104. Detected data transmission unit 104 transmits these serial data to light source control unit 40' (Step S6).

SUB CPU 401 in light source control unit 40' performs the control of light source unit 50 based on the average luminance level and luminance distribution (second histogram data) that are indicated in the image input information that was received by detected data reception unit 402. For example, when the average luminance level is no greater than a fixed level and the gradation level is distributed at low levels, control is implemented to reduce the light quantity (close iris 503) (Step S7), following which the process returns to Step S2.

The operation in the above-described Steps S2-S7 is repeated for each cycle of the vertical synchronizing signal of the image signal that is applied as input to image input unit 10'.

Figure 6:
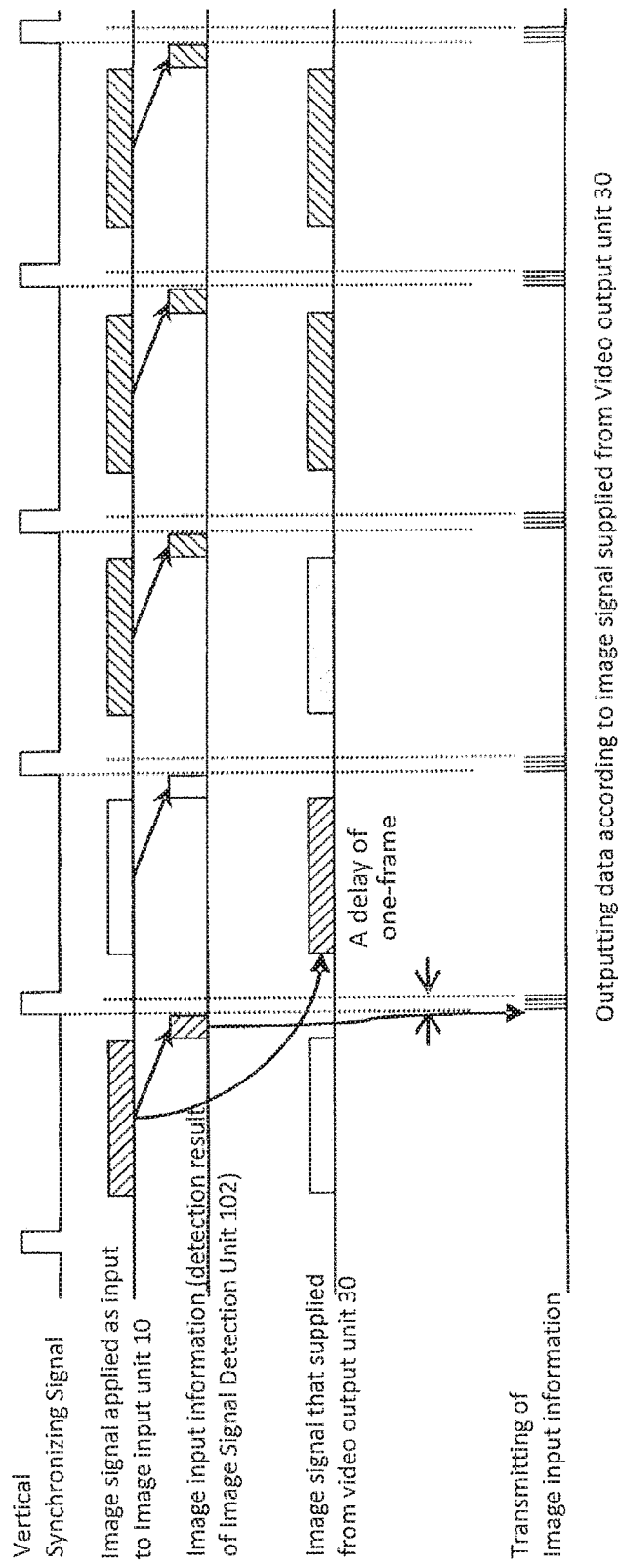
FIG. 6 is a view showing the input/output timing of image signals and image input information in an exemplary embodiment of the present invention.

FIG. 6 shows the input/output timing of the image signal and image input information that is carried out in the present exemplary embodiment.

An image signal that is applied as input to image input unit 10' for each vertical synchronizing signal is transferred to resolution conversion unit 20, and further, the image input information is calculated in image signal detection unit 102. The image input information is calculated within the same frame as the image signal that was received in image input unit 10'. On the other hand, regarding the image signal that is received in resolution conversion unit 20, resolution conversion is carried out in resolution conversion unit 20, subjected to adjustment in video output unit 30', and then supplied from video output unit 30'.

Because there is a delay time that results from the resolution conversion and adjustment realized by resolution conversion unit 20 and video output unit 30', the image signal that is supplied from video output unit 30' is supplied in synchronization with a vertical synchronizing signal (second vertical synchronizing signal) that follows the vertical synchronizing signal (first vertical synchronizing signal) that corresponds to the image signal that was received in image input unit 10', as shown in FIG. 6. More specifically, resolution conversion in resolution conversion unit 20 and adjustment in video output unit 30' are implemented such that the second image signal is supplied such that the image signal is supplied from video output unit 30' between the second vertical synchronizing signal and the vertical synchronizing signal (third vertical synchronizing signal) that follows the second vertical synchronizing signal.

The transmission of image input information from detected data transmission unit 104 to detected data reception unit 402 is carried out both to be synchronized with the second vertical synchronizing signal and to precede the output of the image signal of video output unit 30'. As a result, SUB CPU 401 is able to reliably perform light source control over the image signal that indicates an image that is projected for an instant (only one frame of at least 1/60 second but no greater than 2/60 second).

In the above explanation, image input information is sent to detected data reception unit 402 from image signal detection unit 102 by way of detected data transmission unit 104, and SUB CPU 401 implements control of light source unit 50 on the basis of the average luminance level and luminance distribution (second histogram data) indicated in the image input information. According to another configuration that can be considered, instead of the image input information, control data are generated for performing iris opening/closing control of iris control unit 503 in light source unit 50 and sent to detected data reception unit 402 by way of detected data transmission unit 104, and SUB CPU 401 generates a control signal for performing iris opening/closing control of iris control unit 503 in light source unit 50 in accordance with the control data.

Figure 1:
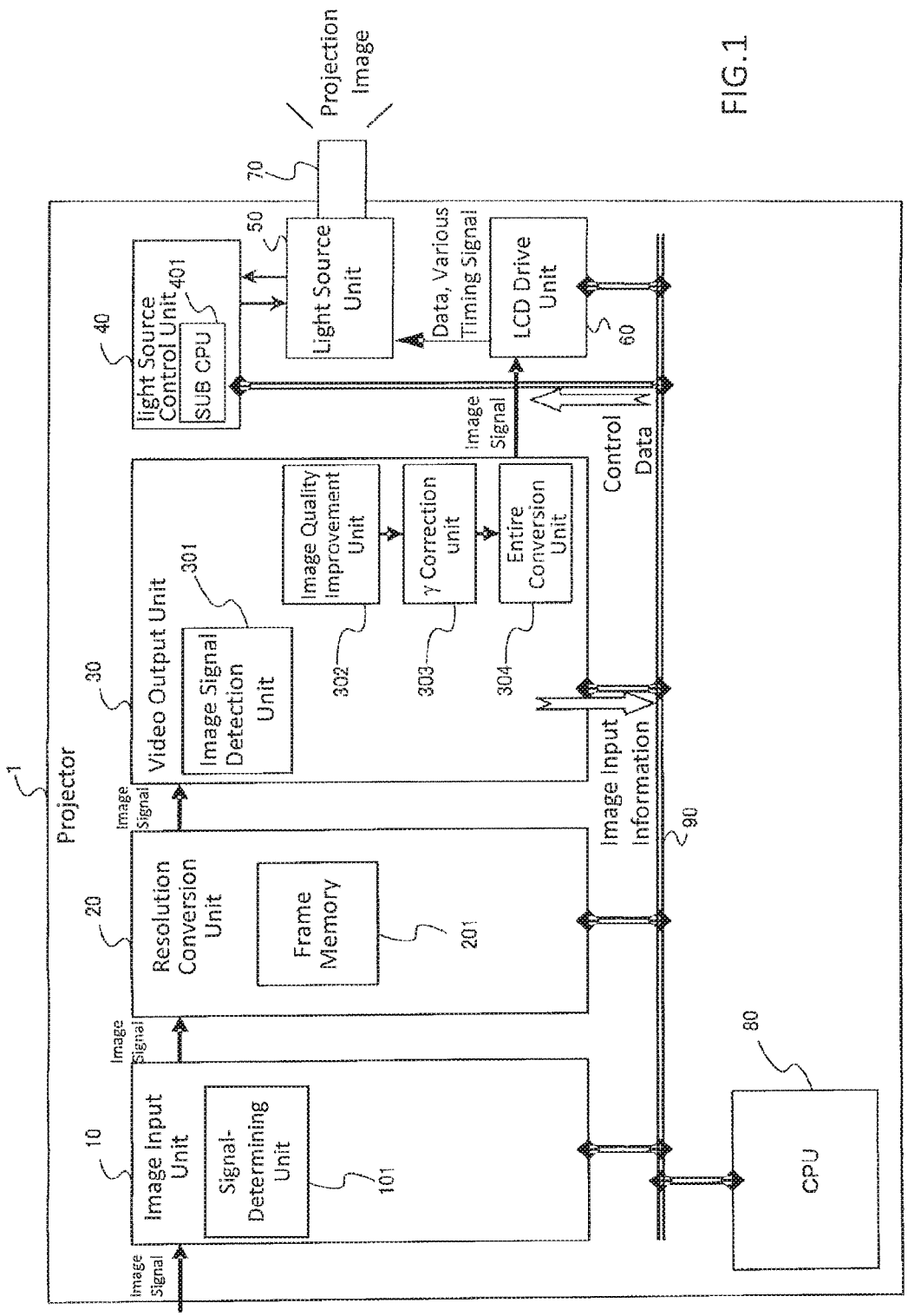
FIG. 1 is a block diagram showing the configuration of a projector in which brightness is adjusted in accordance with the state of the luminance distribution and the average luminance level of an image signal that is received as input.
Figure 2:
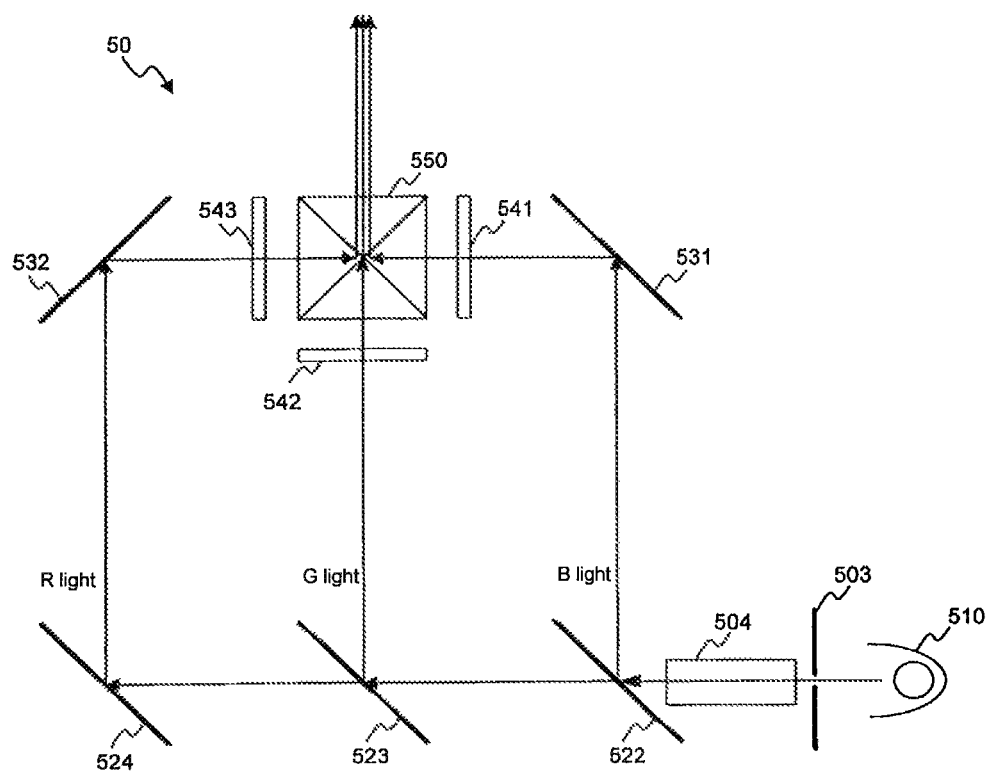
FIG. 2 shows the configuration of light source unit 50 shown in FIG. 1.
Figure 3:
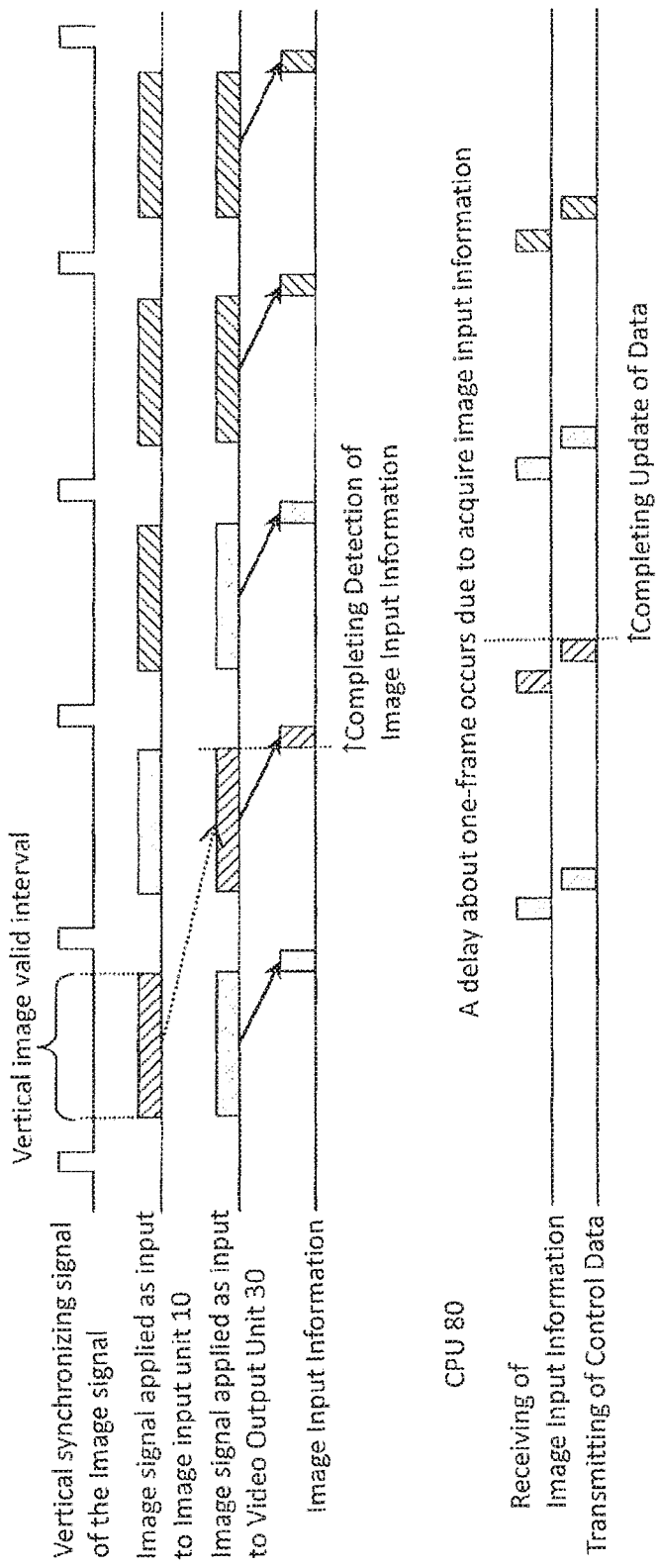
FIG. 3 shows the timings of reception of the vertical synchronizing signal of an image signal that is applied as input to image input unit 10 in FIG. 1, an image signal that is applied as input to image input unit 10, an image signal that is applied as input to video output unit 30, image input information that is detected in an image signal detection unit, and image input information in CPU 80 and the timing at which CPU 80 transmits control data to light source control unit 40.
Figure 4:
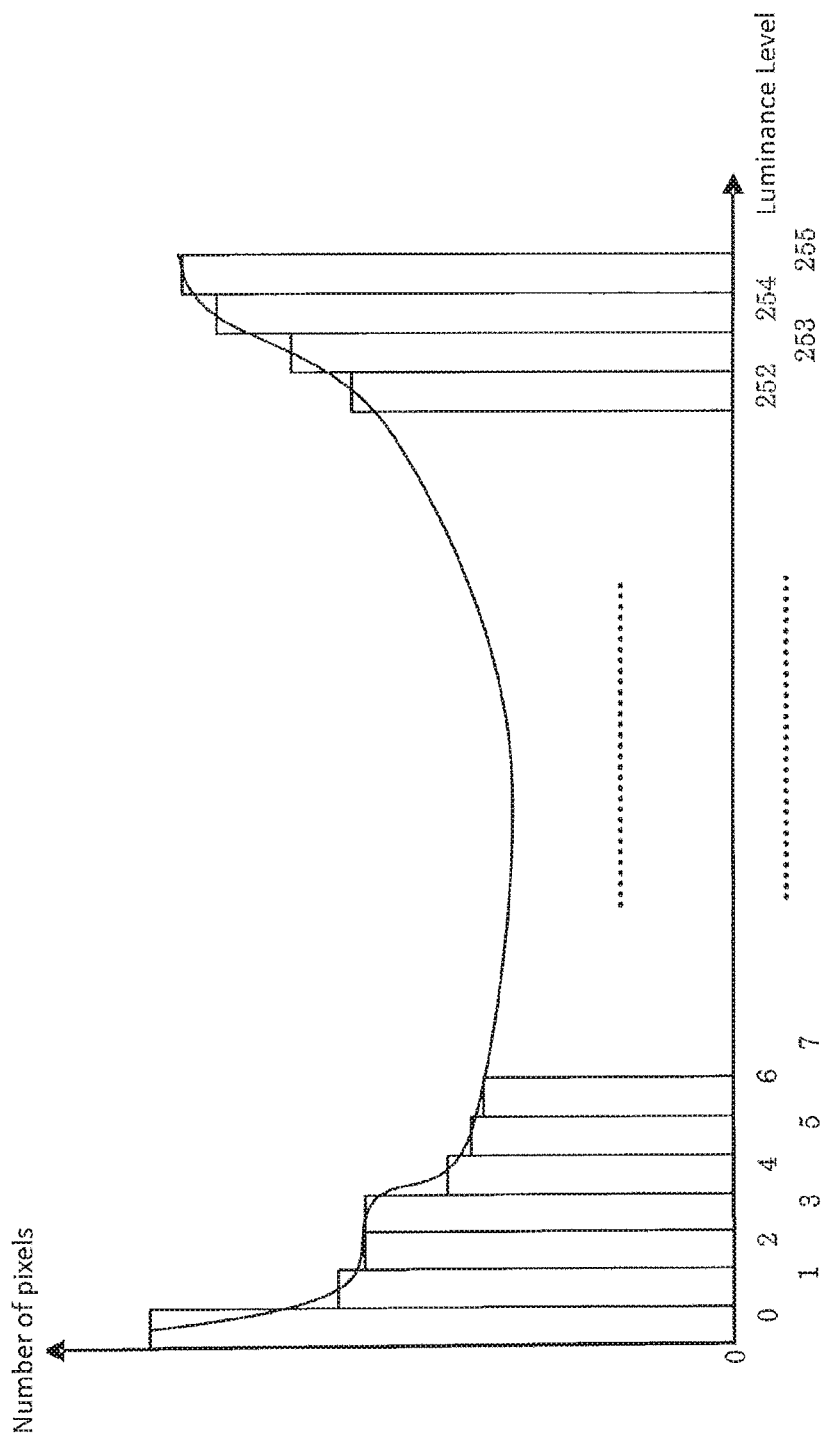
FIG. 4 shows the luminance distribution (histogram data) of an image signal of 8-bit gradation.

In addition, in the present exemplary embodiment, image input information is calculated in image signal detection unit 102 that is provided in image input unit 10'. The image signal that is supplied from image input unit 10' is supplied to LCD drive unit 60 by way of resolution conversion unit 20 and video output unit 30'. Video output unit 30 in projector 1 shown in FIG. 1 is provided with image signal detection unit 301 and is a necessary component, but video output unit 30' in the present exemplary embodiment is a component directed only to image adjustment and is not necessary. As a result, the image signal that is supplied by resolution conversion unit 20 is assumed to be sent directly to LCD drive unit 60, and video output unit 30' may be omitted. In this case, resolution conversion unit 20 becomes a resolution conversion output unit.

In addition, light source unit 50 uses LCDs 541-543 as image-forming elements. A configuration may also be adopted in which, instead of LCDs, DMDs (Digital Micromirror Devices) are used as image-forming elements. In this case, LCD drive unit 60 that is the image-forming element drive unit becomes the DMD drive unit that drives the DMDs.

Alternatively, although a configuration was described in which the image signal that is applied as input to image input unit 10' for each vertical synchronizing signal is transferred to resolution conversion unit 20, a configuration is also possible in which the image signal is applied as input in parallel to both image input unit 10' and resolution conversion unit 20. In the case of this configuration, not only can the terminals and circuits (neither being shown in the figures) for transmitting a signal to resolution conversion unit 20 be omitted in image input unit 10', but the delay that originates in the transfer is also eliminated.

In the present exemplary embodiment that is configured as described above, by transmitting image input information or light source control data directly to light source control unit 40' in synchronization with the vertical synchronizing signal of image signal input as shown in FIG. 6 and FIG. 7, the delay (divergence) of the image signal that is applied as input to image input unit 10' and of the image input information that is acquired from this image signal can be canceled by utilizing the delay that occurs during resolution conversion by resolution conversion unit 20, whereby a configuration can be constructed that enables control of the light source in real time.

EXPLANATION OF REFERENCE NUMBERS

1' Projector
10' Image Input Unit
20 Resolution Conversion Unit
30' Video Output Unit
40' Light Source Control Unit
50 Light Source Unit
60 LCD Drive Unit

The invention claimed is:

1. A projector comprising:
   an image input unit that receives as input a first image signal that is synchronized with a vertical synchronizing signal;
   a resolution conversion output unit that converts said first image signal to a second image signal that indicates an image of a predetermined resolution and supplies the result;
   a light source unit that is provided with a light source and an image-forming element that uses illumination light from said light source to generate image light;
   a light source control unit that controls the light quantity of said light source; and
   an image-forming element drive unit that drives said image-forming element on the basis of said second image signal, wherein:
   said image input unit calculates a ratio of a resolution of the image indicated by said first image signal and a resolution of the image indicated by said second image signal, an average luminance level of said first image signal, first histogram data that are a luminance distribution of said first image signal and second histogram data obtained by multiplying said ratio by said first histogram data;
   said image input unit sends to said light source control unit image input information that contains said average luminance level and said second histogram data;
   said light source control unit uses said image input information to control said light source;
   said image input unit transmits to said light source control unit said image input information for said first image signal that is synchronized with said first vertical synchronizing signal in synchronization with a second vertical synchronizing signal that follows said first vertical synchronizing signal; and
   said resolution conversion output unit carries out conversion such that said second image signal is supplied between said second vertical synchronizing signal and a third vertical synchronizing signal that follows said second vertical synchronizing signal.

2. The projector according to claim 1, wherein said image-forming element comprises an LCD.

3. The projector according to claim 1, wherein said image-forming element comprises a DMD.

4. The projector according to claim 1, wherein said resolution conversion output unit comprises a resolution conversion unit that supplies as output said first image signal as an image signal that indicates an image of a predetermined resolution, and a video output unit that subjects the image signal that was supplied by said resolution conversion unit to adjustment and supplies the result as said second image signal.

5. The projector according to claim 1, wherein said image input unit comprises:
   a coefficient retaining unit that holds the resolution of an image that is indicated by said second image signal;
   a signal-determining unit that acquires input resolution information that indicates the resolution of said first image signal; and
   an image signal detection unit that uses the resolution of the image that is indicated by said second image signal and that is held by said coefficient retaining unit and input resolution information that was acquired by said signal-determining unit to calculate said image input information.

6. A method of controlling a light source that is carried out in a projector that has:
   an image input unit that receives as input a first image signal that is synchronized with a vertical synchronizing signal;
   a resolution conversion output unit that converts said first image signal to a second image signal that indicates an image of a predetermined resolution and supplies the result as output;
   a light source unit that is provided with a light source and an image-forming element that uses illumination light from the light source to generate image light;
   a light source control unit that controls the light quantity of said light source; and
   an image-forming element drive unit that drives said image-forming element on the basis of said second image signal,
   said method of controlling a light source comprising:
   calculating, by said image input unit, a ratio of a resolution of the image indicated by said first image signal and a resolution of the image indicated by said second image signal, an average luminance level of said first image signal, first histogram data that are a luminance distribution of said first image signal and second histogram data that are obtained by multiplying said ratio by said first histogram data;
   sending, by said image input unit, to said light source control unit image input information that contains said average luminance level and said second histogram data;
   using, by said light source control unit, said image input information to control said light source;
   sending, by said image input unit, to said light source control unit said image input information for said first image signal that is synchronized with a first vertical synchronizing signal in synchronization with a second vertical synchronizing signal that follows said first vertical synchronizing signal; and
   carrying out, by said resolution conversion output unit, conversion such that said second image signal is supplied between said second vertical synchronizing signal and a third vertical synchronizing signal that follows said second vertical synchronizing signal.

* * * * *